United States Patent Office 3,637,768
Patented Jan. 25, 1972

3,637,768
EPOXIDATION OF OLEFIN WITH AN OXOLANE
Richard D. Smetana, Beacon, N.Y., assignor to Texaco Development Corporation, New York, N.Y.
No Drawing. Filed Mar. 18, 1969, Ser. No. 808,348
Int. Cl. C07d 1/08
U.S. Cl. 260—348.5 L
8 Claims

ABSTRACT OF THE DISCLOSURE

A method of producing an epoxide of the formula:

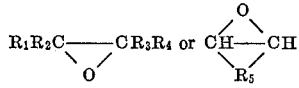

where $R_1$, $R_2$, $R_3$ and $R_4$ are hydrogen, alkyl, alkylaryl, arylalkyl or aryl and $R_5$ is $\alpha,\Omega$-alkylene comprising contacting an olefin of the formula:

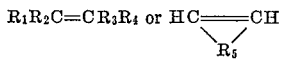

with an oxolane of the formula:

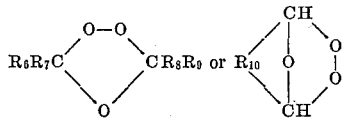

where $R_6$, $R_7$, $R_8$ and $R_9$ are hydrogen, alkyl, aryl, alkylaryl and arylalkyl and $R_{10}$ is $\alpha,\Omega$-alkylene in the presence of a molybdenum, tungsten or vanadium epoxidation catalyst.

BACKGROUND OF INVENTION

In the past, a standard means of preparing epoxides of the type contemplated herein was by contacting the unsaturated alkenes, cycloalkenes and their substituted derivatives with peroxy compounds such as peracetic, perbenzoic and monoperphthalic acids. Although this past reaction does produce epoxides, it is not entirely satisfactory in respect to selectivity to epoxide formation and yield of epoxide product.

SUMMARY OF INVENTION

I have discovered a method which is more highly selective to the production of epoxides characterized by the formula

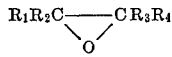

of from 5 to 12 carbons and

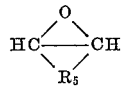

of from 6 to 8 carbons; from their unsaturated hydrocarbon precursors. In addition, the method of the invention produces epoxides in yields more attractive from a commercial standpoint than many of the prior art methods. Particularly, my method comprises contacting an olefin of the formula:

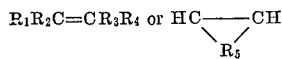

with an oxolane of the formula:

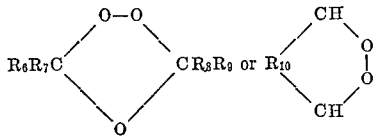

in the presence of a molybdenum, tungsten or vanadium catalyst, said $R_1$, $R_2$, $R_3$, $R_4$, $R_6$, $R_7$, $R_8$ and $R_9$ are members of the group of hydrogen, and alkyl, aryl, alkylaryl and arylalkyl and of from 1 to 25 carbons and $R_5$ and $R_{10}$ are alpha, omega ($\alpha,\Omega$)-alkylene of from 3 to 20 carbons. More specific examples of said olefin and oxolane are $R_1R_2C=CR_3R_4$ of from 5 to 12 carbons,

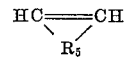

of from 6 to 8 carbons,

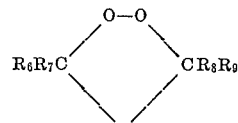

of from 5 to 12 carbons, and

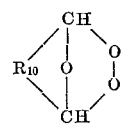

of from 6 to 8 carbons.

DETAILED DESCRIPTION OF THE INVENTION

More specifically, the method of the invention involves preparing an epoxide comprising contacting an olefin with an oxolane, all as heretofore defined, in the presence of between about 0.01 and 10 wt. percent based on the reaction mixture of a molybdenum, tungsten or vanadium epoxidation catalyst utilizing a mole ratio of olefin to oxolane of between about 1:1 and 100:1 at a temperature between about 25 and 200° C. and under a pressure ranging from about 1 to 100 atmospheres or higher. Under preferred conditions, the oxolane reactant is introduced into the reaction zone after the introduction of olefin and catalyst.

If needed to facilitate contact of reactants and catalyst, the reaction can be conducted in the present of inert liquid solvent. Normally, solvent quantities employed are of between about 50 and 95 wt. percent based on the reaction mixture. Further, to additionally facilitate contact agitation is preferably employed such as stirring, particularly when one of the ingredients is insoluble in the reaction mixture.

Recovery of the epoxide product is accomplished by standard means such as by filtration to remove reaction solids such as catalyst followed by fractional distillation to recover the epoxide as overhead or residue depending on its relative boiling point in respect to the final reaction medium ingredients.

The oxolane reactants are prepared by contacting a corresponding olefinic hydrocarbon as heretofore defined with ozone. Normally, the ozone is in admixture with oxygen or air, said admixture containing between about 0.1 and 15 mole percent ozone. The conditions employed are a temperature ranging between about —100 and 100° C., utilizing a mole ratio of ozone to olefin of between about 1:1 and 1:20, the resultant oxolane being isolated, if desired, by standard means such as fractional distillation. Inert solvent and agitation are preferably employed to facilitate reactant contact. Solvent quantities of between about 80 and 99 wt. percent of the oxolane preparation reaction mixture are advantageously employed.

The solvent employed in the preparation of the oxolane intermediate must be particularly inert to zwitterion attack. Further, in the oxolane preparation the solvent must be reasonably resistant to attack by ozone at low temperatures. Solvent fitting both specifications are liquid paraffins, halogenated paraffins, and dialkyl ethers. Specific examples of solvents particularly suitable are chloroform, methylene chloride, pentane and diethyl ether. In the oxolane reaction preparation the formed oxolane or solvent can be removed by distillation, e.g., vacuum prior to reaction with olefin-catalyst mixture. However, the low polarity of the aforementioned solvents should not interfere with the selectivity of the reaction to the epoxide, and therefore, need not be removed prior to use of the oxolane reactant.

Specific examples of the oxolane compound reactants contemplated herein are 3-hexyl - 1,2,4 - trioxolane from 1-octene, 3-methyl - 3 - propyl - 1,2,4 - trioxolane from 2 - methyl - 1 - penten, 3 - methyl - 3 - phenyl - 1,2,4-trioxolane from α-methylstyrene, 3-methyl - 3 - (p-isopropylbenzene) - 1,2,4 - trioxolane, 7,8,9-trioxabicyclo-[4.2.1]nonane (from cyclohexene) of the formula:

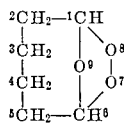

Examples of the epoxide compounds produced in the method of the invention are 1,2-octene oxide, 2,3-octene oxide, 2 - methyl - 1,2 - pentene oxide, 1,2 - cyclooctene oxide, 1,2 - cyclohexene oxide and 2 - phenyl-1,2-propene oxide, respectively formed from 1-octene, 2-octene, 2-methyl - 1 - pentene, cyclooctene, cyclohexene, and α-methylstyrene.

Examples of the olefins contemplated herein for the oxolane and epoxide preparation are the unsubstituted and substituted alkenes and cycloalkenes such as 1-octene, 2-octene, 1-pentene, 2-pentene, 1-hexene, 2-methyl-1-pentene, cyclohexene, cyclooctene, α-methylstyrene, ortho- and meta- and para-diiso-propenylbenzene, ortho-, meta- and 2-(p-isopropylbenzene)-1-propene and 1-phenylcyclohexene.

Examples of the transitional metal catalysts contemplated herein are transitional metal carbonyls, chlorides, oxides, sulfides, phospho-oxygen heteropoly acids, silico-oxygen heteropoly acids, oxygen acid, the alkali metal salts of said acids, and carboxylates wherein the transitional metal is molybdenum, tungsten or vanadium. Specific examples of the aforementioned catalyst are molybdenum hexacarbonyl, molybdenum trioxide, molybdenum dioxide, sodium molybdate, molybdenum oxyacetylacetonate, sodium phospho - 12 - molybdate, sodium phospho - 18 - molybdate, phosphomolybdic acid, molybdenum sulfide, silico-molybdic acid and molybdenum pentachloride, ethylphosphomolybdate and their vandium and tungsten counterparts such as sodium vanadate, vanadium pentoxide, and sodium tungstate.

The following examples further illustrate the method of the invention but are not to be construed as limitations thereof.

EXAMPLE I

This example illustrates the preparation of the 3-methyl- - 3 - phenyl - 1,2,4 - trioxolane reactant.

To a 200 ml., 3-neck, Pyrex flask equipped with a gas sparger, a thermometer, a water condenser and a magnetic stirrer, there was charged 23.6 grams, i.e., 200 millimoles (mmole) of alpha-methylstyrene together with 100 grams of pentane. An oxygen stream containing 4 mole percent ozone was passed through the liquid reaction mixture maintained at a temperature of −44° C. and the ozone containing gas introduction was continued until a total of 204 mmole ozone were introduced, that is, continued until there was an appearance of a blue color of ozone in the reaction mixture which signaled the completion of the olefin ozonation. The pentane solvent component in the reaction mixture was removed by fractional distillation leaving a residual clear oil weighing 29.5 grams and containing a 64 wt. percent yield based on olefin charge of 3-methyl-3-phenyl-1,2,4-trioxolane.

EXAMPLE II

This example illustrates the preparation of 3-methyl-3-propyl-1,2,4-trioxolane.

To a 200 ml. flask equipped as described in Example I, there was charged 16.8 grams, i.e. 200 mmole of 2-methyl-1-pentene and 100 grams of pentane solvent. The resultant mixture was maintained at a temperature of −45° C. and a gaseous mixture of oxygen and ozone (4 mole percent $O_3$) was passed therethrough until a total of 203 mmoles of ozone were added, that is, until a blue ozone color appeared in the reaction mixture. The pentane solvent was removed by fractional distillation leaving 21.4 grams of a residual oil representing a yield of 55 wt. percent based on olefin charge of 3-methyl-3-propyl-1,2,4-trioxolane.

EXAMPLE III

This example illustrates the preparation of the hydrocarbyl epoxides from their oxolane precursors.

To a 100 ml. 1-neck, Pyrex flask fitted with a magnetic stirring bar and an anhydrous clacium sulfate drying tube, olefin and catalyst were charged followed by the addition of the oxolane containing residual oil prepared by the method of Examples I or II. The reaction mixture was heated and stirred. At the end of the reaction the product was analyzed via chromatographic gas analysis. Four runs were conducted. The test data and results are reported below in Tables I and Ia:

TABLE I

Reaction and product data

| Run: | A |
|---|---|
| Reactant and cat., (millimoles): | |
| Olefin | 1-octene (243). |
| Oxolane | 3-methyl - 3 - phenyl-1,2,4 - trioxolane, (28.4). |
| Catalyst | $MoO_3$ (1). |
| Reaction cond.: | |
| Temp., ° C. | 105. |
| Time, hrs. | 46. |
| Product and Yield: | |
| Oxide product | 1,2-octene oxide. |
| Yield,[1] mole percent | 19. |

[1] Based on oxolane.

TABLE Ia.—REACTION AND PRODUCT DATA

| Run | B | C | D |
|---|---|---|---|
| Reactant and cat., (millimoles): | | | |
| Olefin | 1-octene (268) | Cyclohexane (357) | α-Methylstyrene (254). |
| Oxolane | 3-methyl-3-propyl-1,2,4-trioxolane (25). | 3-methyl-3-propyl-1,2,4-trioxolane (25). | 3-methyl-3-propyl-1,2,4-trioxolane (25). |
| Catalyst | $Mo(CO)_6$(1) | $Mo(CO)_6$(1) | $Mo(CO)_6$(1). |
| Reaction cond.: | | | |
| Temp., ° C. | 92 | 81 | 106. |
| Time, hrs. | 1 | 4 | 1. |
| Product and yield: | | | |
| Oxide product | 1,2-cyclohexene oxide | 1,2-octene oxide | 2-phenyl-1,2-propene oxide. |
| Yield, mole percent* | 20 | 23 | 77. |

*Based on oxolane.

I claim:
1. A method of producing an epoxide of the formula

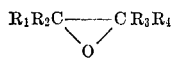

having from 5 to 12 carbons or of the formula:

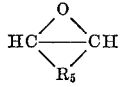

having from 6 to 8 carbons comprising contacting an olefin of the formula:

$$R_1R_2C=CR_3R_4$$

having from 5 to 12 carbons or of the formula:

having from 6 to 8 carbons with an oxolane of the formula:

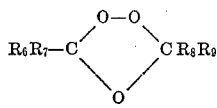

having from 5 to 12 carbons or of the formula:

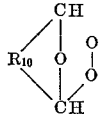

having from 6 to 8 carbons in the presence of a molybdenum, tungsten or vanadium epoxidation catalyst at a temperature between about 25 and 200° C., utilizing a mole ratio of first olefin to oxolane of between about 1:1 and 100:1 and a catalyst content of between about 0.01 and 10 wt. percent based on the reaction mixture, said $R_1$, $R_2$, $R_3$, $R_4$, $R_6$, $R_7$ and $R_9$ being hydrogen or alkyl, aryl, alkaryl, or arylalkyl and $R_5$ and $R_{10}$ being α, Ω-alkylene.

2. A method in accordance with claim 1 wherein said catalyst is molybdenum trioxide or molybdenum hexacarbonyl.

3. A method in accordance with claim 1 wherein said epoxide is 1,2 - octeneoxide, said oxolane is 3 - methyl-3-phenyl - 1,2,4 - trioxolane, said olefin is 1-octene and said catalyst is molybdenum trioxide.

4. A method in accordance with claim 1 wherein said oxolane is 3-methyl - 3 - propyl - 1,2,4 - trioxolane and said catalyst is molybdenum hexacarbonyl.

5. A method in accordance with claim 4 wherein said olefin is 1-octene and said epoxide is 1,2-octene oxide.

6. A method in accordance with claim 4 wherein said olefin is cyclohexene and said epoxide is cyclohexene.

7. A method in accordance with claim 4 wherein said olefin is cyclooctene and said epoxide is cyclooctene oxide.

8. A method in accordance with claim 4 wherein said olefin is α-methylstyrene and said epoxide is 2-phenyl-1,2-propene oxide.

References Cited

UNITED STATES PATENTS 3,160,639  12/1964  Long et al. _____ 260—346.1
3,259,638  7/1966   Allison _____ 260—348.5 V

OTHER REFERENCES

Russian Chemical Reviews, vol. 36, No. 4 (April 1967) pp. 284–294.

NORMA S. MILESTONE, Primary Examiner

U.S. Cl. X.R.

260—339